(12) United States Patent
Schaal et al.

(10) Patent No.: US 8,594,959 B2
(45) Date of Patent: Nov. 26, 2013

(54) PERIODIC LIGHTING DEVICE

(76) Inventors: Herbert Rudolf Schaal, Bellvue, CO (US); Viacheslav Vasilievich Zhurin, Fort Collins, CO (US)

(*) Notice: Subject to any disclaimer, the term of this patent is extended or adjusted under 35 U.S.C. 154(b) by 395 days.

(21) Appl. No.: 12/590,467

(22) Filed: Nov. 9, 2009

(65) Prior Publication Data

US 2011/0109236 A1     May 12, 2011

(51) Int. Cl.
*G01R 13/00*     (2006.01)

(52) U.S. Cl.
USPC ............... 702/66; 702/64; 702/78; 702/79; 362/124; 43/2; 43/42.25; 40/442

(58) Field of Classification Search
USPC ........... 315/169.1, 169.3, 291, 307, 149, 360, 315/362; 362/124, 249.02, 249.05, 249.06, 362/286; 435/286.7, 288.7; 40/442, 431; 43/2, 42, 25, 42.32; 702/64, 66, 76, 78, 702/79, 85

See application file for complete search history.

(56) References Cited

U.S. PATENT DOCUMENTS

| | | | |
|---|---|---|---|
| D320,053 S | 9/1991 | Klawitter | |
| D325,231 S | 4/1992 | Reynolds | |
| 5,157,857 A | 10/1992 | Livingston | |
| 5,450,063 A | 9/1995 | Peterson et al. | |
| 5,495,690 A | 3/1996 | Hunt | |
| 5,565,360 A * | 10/1996 | Lapota et al. | 435/286.7 |
| 5,814,078 A * | 9/1998 | Zhou et al. | 607/1 |
| D418,548 S | 1/2000 | Papke | |
| 6,289,815 B1 | 9/2001 | Tougeron et al. | |
| 6,807,765 B2 | 10/2004 | Watermann | |
| 6,851,208 B2 | 2/2005 | Carter | |
| 7,212,932 B1 | 5/2007 | Taylor | |
| 7,771,990 B2 * | 8/2010 | Jones | 435/288.7 |
| 2010/0202139 A1 * | 8/2010 | Lynn | 362/231 |

* cited by examiner

*Primary Examiner* — Haiss Philogene (57) ABSTRACT

There is presented a detailed electronic method for simulation of a firefly, other insects, or organisms producing bioluminescence and with light radiation functions similar to a real firefly, other insects, or organisms producing bioluminescence. An illuminated artificial firefly, other insects, or organisms producing bioluminescence can be placed on trees and shrubs in landscape, or at home to produce radiation, at night time, and blinking a gradually decaying light. More particularly it relates to a decorative type of device in the form of a firefly, other insects, or organisms producing bioluminescence and with light radiation functions similar to a real firefly, other insects, or organisms producing bioluminescence. The light is simulated by an electronics program that is a part of compact device with the form of a real firefly, other insects, or organisms producing bioluminescence. Short radiation pulses of microsecond-millisecond duration time in violet and ultraviolet range of radiation wavelengths can be utilized for scaring birds or other animals from undesirable or dangerous places of human activity, such as airports, contaminated ponds, wind turbines, electorized fences and antennas.

5 Claims, 10 Drawing Sheets

PERIODIC LIGHTING DEVICE

FIELD OF THE INVENTION

This invention relates generally to the field of illuminated artificial devices that can be placed on trees and shrubs in landscape to produce, at night time, a blinking gradually changing light intensity. In particular it relates to a decorative type of lighting in the form of a lighting firefly, a railroad worm, a click beetle, a New Zeeland Glowworm and similar organisms producing bioluminescence and with light radiation functions similar to a real firefly, a railroad worm, a click beetle, a New Zeeland Glowworm and similar organisms producing bioluminescence. The light is simulated by an electronic program that is a part of compact device with a form of a real firefly, a railroad worm, a click beetle, a New Zeeland Glowworm and similar organisms producing bioluminescence. The simulated light of organisms is designed for creation of light displays with possibilities of imitation of a mood that suggests live fireflies and other organisms possessing bioluminescence. Also this invention relates to the field of imitation of specific radiation pulses that produce threatening effect on birds, animals, insects in specific areas such as airports, parks, public places, where they could be a threat to human life, and areas such as polluted ponds, where birds, animals, insects could be threatened by human activities.

BACKGROUND OF THE INVENTION

People from the early history were always intrigued and puzzled with emission of light by wild living things. At modern times such light emission is called a bioluminescence. References about luminous animals is found in Chinese Shin Ching or Book of Odes (1500-1000 BC); Thales of Miletus (called sometime as Father of Philosophy, 600-500 BC) wrote about bioluminescence, described by Vanderskoi in "Light Emission Mechanisms: Bioluminescence", Lectures, Penn State University, Mar. 29, 2006. Also referenced by Vanderskoi that Benjamin Franklin wrote in 1740 about bioluminescence and its electrical nature. Bioluminescence is a light emission produced by living organisms. Many organisms emit luminescence so strong that it can be easily detected; some organisms produce very light radiation that can be detected by special instrumentation. Some well-known representatives that emanate strong radiation are: Fireflies, New Zeeland Glowworm, Railroad Worm, Click Beetle, varieties of light emitting organisms in the ocean such as Flashlight fish, Anglerfish and many others.

For thousands of years various decorative illuminations have been known to human beings. Illuminations provide esthetic pleasure for people in the evening and night time. The most known illuminations in our regular life are Christmas tree decorative lights. The ancient Chinese sometimes captured fireflies, put them in transparent or semi-transparent containers and used them as (short-term) lanterns. In the Bibble, the Garden of Eden illumination is described as a collage of vibrant creatures and plants. This patent is devoted to the design of a device, or devices imitating the light produced by some insect species, such as Railroad Worm, Click Beetle, and, in particular, fireflies, producing short flashes visible at night time.

Fireflies have been and still are one of world wonders that surprise and entertain us, and, as some sources say, give hope for future better life. Various types of fireflies exist in many parts of the world. Usually they are active after dark and produce radiating lighting beams of short sparks. For example, male fireflies of *Photinus pyralis* species generate a single half spark during its rising flight motion. The female of this species produces a longer single spark. Another type of firefly called *Photinus consumilis* gives the signals to his mate in a form of a rapid succession of sparks. A spark duration time varies from a short flash of ½ second to about 10 seconds with gradual decay of radiation. She responds with two flashes. The light produced by fireflies from their abdomen is called a bioluminescence. It takes place when oxygen and an organic compound luciferin react together in presence of an enzyme, lucifereace. This reaction creates light. The color of radiation is a yellow/green. Although other insects can produce light, fireflies are the only insects that can flash their light on and off in distinct signals.

In the article "*The spectral Distribution of Firefly Light*" by H. H. Seliger et al in *The Journal of General Physiology*, Vol 48, 1964, p 95-104 there are presented results of observation of about 100 various fireflies from Jamaica and some parts of eastern United States. These results show that in general a firefly intensity is between about 490 nm and about 710 nm with a wave length band of about 220 nm. This is a quite a broad band for fireflies. The peak intensity is at about 560 nm, which is a yellow-green color.

There have been several patents describing decorations and imitations of fireflies, in some cases called lightning bugs. In U.S. Pat. No. Des. 320,053 there is presented the ornament design for a lightning bug wheeled push toy. This toy is too big for a real imitation and does not produce any lightning radiation similar to fireflies. In U.S. Pat. No. Des. 325,231 there is described a stuffed figure of a lightning bug with forms of very similar to one type of lightning bugs, except of a large scale and without any lightning sparks. There is a U.S. Pat. No. Des. 418,548 describing the ornamental design for a lightning flashlight toy. This toy is made in the form of a cylinder with a transparent upper end that can operate as a flashlight. The patent's author W. Papke called this device a lightning bug because it can produce short lightning sparks, just turning it on and off. This device has quite large dimensions, and looks more as a flashlight.

In the U.S. Pat. No. 6,851,208 there is presented a firefly simulation device that consists of a transformer, an electric fan with a propeller, a resistor, and a light emitting diode (LED) that provides a yellow-green light. LED has a body and a lens. All parts are connected with wires. A fan and LED develop certain effect as a firefly simulator. The assembly is quite a bulky and complex device. Utilization of fan with a propeller represents a certain danger for real fireflies that can be attracted by this a firefly simulation device.

In the U.S. Pat. No. 5,495,690 there is presented an electronic fishing lure that can simulate light similar to produced by a firefly. An electronic firefly fishing lure has green blinking light emitting diode (LED) that attracts fish. There are several other U.S. patents about an electronic fishing lure. One of them is a U.S. Pat. No. 5,157,857 has a fishing lure that is powered by battery and is activated when an electrical circuit touches water that connects an electrical circuit.

In the U.S. Pat. No. 7,212,932 "Method for Emulating Visible Electromagnetic Spectrum Emissions of Member Species of *Anthropoda: Insecta: Coleoptera: Lampyridae*" by S. J. Taylor there is presented one of the methods for simulation of visible radiation of *Lampyridae* species. The patent described general approach for simulation of visible radiation through a programmable software program, a data memory, a data processor, a clock frequency timer, and a light emitting means. There is no information about any specific programming for simulation of a bioluminescence radiation of *Anthropoda* species, or how to program and simulate radiation of New Zeeland Glowworm, Railroad Worm, Click Beetle, varieties of light emitting organisms in the ocean such as Flashlight fish, Anglerfish and many others.

Because of existing high interest in bioluminescence produced by various insects and its possible applications in science and technology, there are many publications about observations in nature and in laboratory conditions of organisms emitting bioluminescence with utilization of high resolution electromagnetic spectra. In "Bioluminescence Emissions of the firefly" by A. G. Barua et al, published by Nature Proceedings: hdl: 10101/npre. 2007. 1351.1: Nov. 19, 2007, there are recorded emission and time-resolved spectra of a firefly *Pyrophorus Noctilucus*. The time resolved spectra showed that a flash of about one hundred milliseconds duration is composed of a series of microsecond pulses. The peak wavelength was observed at 564 nm, i.e. in the green-yellow region. They found that time-resolved spectrum exhibits good similarity with an output of a multimode laser. In one of recent publications in Japanese scientific literature "On the Evaluation of Healing Effect by Luminous Pattern of Firefly with the Aid of Semantic Differential Analysis" by Inagaki Terumi et al, published in Japanese Journal of Dynamics & Design Conference, p. 324, 2001, the Japan Society of Mechanical Engineers, the authors described and focused not only on the light of a firefly, which keeps fascinating the hearts of Japanese people from ancient times, but also on the ecosystem of nature. With aid of the semantic differential analysis, they examined what kind of effect fireflies caused on the human spirit. They found that there is a high possibility that a sufficient cure effect exists in the light emission pattern of a firefly and the ecosystem.

Another aspect of work with simulation of radiation pulses is not in copying of a bioluminescence radiation of insects or other animals, but a generation of radiation threatening pulses that can be produced to prevent collisions with jet aircraft. It is well-known that birds present a serious hazard to aviation. A flying aircraft can collide with a bird or a flock of birds, especially at low heights. In fact, every year hundreds of collisions of birds have collide with airplanes only in USA. It is necessary to have various means to scare birds from areas of flying airplanes, especially at airports. The survival at scare of birds is another issue. Unfortunately, human technical activities created dangerous areas such as toxic ponds, wind generators, electrified fences and large antennas that should be avoided by birds. Human activity that is hazardous for birds includes microwave, radar and other signal generation. Also there are areas, such as public parks and buildings, where the presence of some birds, wild animals, or various insects can be problematic.

In publications like "Birds at Airports" by A. J. Godin, published by Prevention and Control of Wildlife Damage, USDA-APHIS, 1994, and "A Revolution in Bird Control" by M. Amir, published at Fourth Eastern Wildlife Damage Control Conference, 1989. The subject was described in detail and included: the serious hazard for aviation, kinds of equipment, damage prevention and control methods are applied in airports. Unfortunately, despite of varieties of utilized devices there are still a large number of accidents involving birds in collisions with airplanes.

There are numerous patents that suggesting how to scare birds at airports. In the U.S. Pat. No. 5,450,063 "Bird Avert System" by R. R. Peterson et al, there is described a quite elaborate system for installation in or around polluted land area. The system that is designed to discourage or frighten away birds includes microwave, radar and other signal generation. This system is made in a form of an electronic net and consists of a programming computer, digital video motion detector, several recorders, at least three amplifiers and other expensive electronics. In the U.S. Pat. No. 6,807,765 "Bird Scaring Device" by U. Watermann there is utilized one, or more silhouettes of a prey bird. In the U.S. Pat. No. 6,289,815 "Device for Controlling Bird Strike Hazards" by R. Tougeron et al, in order to scare away birds from airports area suggests utilizing different devices that include a self-propelled projectile with a delayed firing element and a sound-effect charge. This system is also quite expensive and some consequences of operation are questionable and could be dangerous to people.

There are many publications, patented and unpatented simple and complex devices that are considered as a bird control systems. These systems scare away birds with visual scare devices, materials that shimmer and shine in the sunlight to disorient and confuse any bird that catches a glimpse of such a device, decoy birds that resemble the predators like a Great Horned Owl, laser beams, multi-color stroboscopic bird deterrents and many others.

The above mentioned patents and scientific articles reflect the state of which the applicants are aware, however, none of these patents teach or render ideas that are considered and claimed in this patent application.

SUMMARY OF THE INVENTION

The authors of this patent application take into account various types of bioluminescence radiation produced by different organisms and present one application for simulating natural radiation with the help of an electronic method that can simulate bioluminescence sparks of various organisms with very high accuracy. The purpose of the present invention is also to provide a design that imitates a firefly, other insects, or organisms producing bioluminescence with its specific light that is a visible radiation with a decay time that varies from about 0.5 to about 10 seconds sharply in a millisecond range or gradually from milliseconds to seconds range and delivers radiation image as produced by a real firefly, other insects, or organisms producing bioluminescence.

A further object of this invention is development of electronic circuit with logical programs and subprograms that simulate real firefly, other insects, or organisms producing bioluminescence radiation pulse by linear, or wave-like segments that improve radiation pulse from utilized light emitting diode (LED), or similar source of artificial radiation with a radiation pulse that makes it similar to a real one.

A further object of this invention is development of comparatively small size of an artificial device close to dimensions of a real firefly, other insects, or organisms producing bioluminescence that simulates radiation at nighttime generated by a firefly, other insects, or organisms producing bioluminescence. This device is made of a plastic box that is comprised of the following components: batteries, a light sensor that turns on an electric schematic, a microchip, an LED, or similar source of artificial radiation with a radiation pulse that makes it similar to a real one. As example, the shape of a plastic box suggests a real firefly, form.

Another object of this invention is the incorporation of a regular energy source such as electric power from home or electric batteries and alternative energy sources such as solar panel, or wind power generator of electricity to energize an electric schematic and a light emitting diode, or diodes, or similar source of artificial radiation with a radiation pulse simulating fireflies, other insects, or organisms producing bioluminescence.

Yet another object of the present invention is fabrication of a design that is a vacuum tight and prevents penetration of water vapors (humidity) into the internal parts that has electronics sensitive to water vapors and can be a subject of deterioration due to water vapors.

Still another object of the present invention is development of an electronic schematic that imitates radiation in time and form close to that of a real firefly, other insects, or organisms producing bioluminescence. It means that an artificial firefly, other insects, or organisms producing bioluminescence radiation emanate radiation of various colors corresponding to specific fireflies, other insects, or organisms producing bioluminescence with radiation cycles corresponding to natural fireflies, other insects, or organisms producing bioluminescence. It includes: a) a short spark of about 0.5 second with immediate decay that has time of no more than 1 second; b) a longer spark of 1-3 second with gradual decay of radiation of about 3-5 seconds. There are programmed various other timings for sparks, or flickering from milliseconds to a seconds range.

Another object of the present invention is to reproduce a yellow-green light, or other wavelengths lights that Luciferin (an enzyme or organic catalyst) is responsible for the firefly, other insects, or organisms producing bioluminescence radiation. Available LEDs produce radiation that is similar to a real yellow-green light, or other wavelengths lights of a firefly, other insects, or organisms producing bioluminescence radiation.

Another object of the present invention is to provide an efficient electrical schematic and available LEDs that are compact, inexpensive and reliable in accomplishing a purpose of imitating a firefly, other insects, or organisms producing bioluminescence radiation during significant lifetime of thousands of hours that also is simple to disassemble and assemble. It is necessary to note that all electrical energy stored in an artificial firefly, other insects, or organisms producing bioluminescence does not have any high electric potentials and are not dangerous to human life during assemble-disassemble of a device.

Yet another object of the present invention is fabrication of a firefly, other insects, or organisms producing bioluminescence simulated painted body with a thin film paint capable to reduce regular light so that a light sensor can be regulated and be turned on and off at a specific time.

All further descriptions of the invented simulation of bioluminescence radiations are presented below on a firefly's example. However, similar simulations are valid for other insects, or organisms producing bioluminescence.

Another object of the present invention is fabrication of a small device in a form of a bird, or animal with practically all electronic schematic that is utilized for a firefly, but with a programming of specific radiation pulses of very short duration from few microseconds and up to 100 milliseconds of very bright radiation pulses simulating lightning, or a high-current electrical discharge. Such short time radiation pulses from few microseconds to about 100 milliseconds can be produced by an LED operating in a aqua green and violet range of wavelengths. Research shows that birds' eyes are very sensitive especially to a violet and ultraviolet light. This information can be found in article "Birds See Ultraviolet Light" by J. K. Bowmaker, published by Nature, Vol 284, p 306, Mar. 27, 1980. At present time there are various producers of LED that make them operating in violet and even in ultraviolet regions of wavelengths. For example, American industry makes an Aqua Green LED with a maximum radiation at 525 nm, that also goes into a violet region of about 400 nm, and with very high luminous intensity of 10,000 millicandella at 20 mA of discharge current. Such bright short time sparks of microseconds to milliseconds are could be quite frightening for birds, if they will be triggered randomly in various locations of areas that are necessary to be free of birds.

DETAILED DESCRIPTION OF THE PREFERRED EMBODIMENTS

Referring to FIG. 1-7, there are presented schematic electric circuit and logical schematic diagrams programming simulation of artificial firefly luminosity generated by electric schematic.

Figure 1:
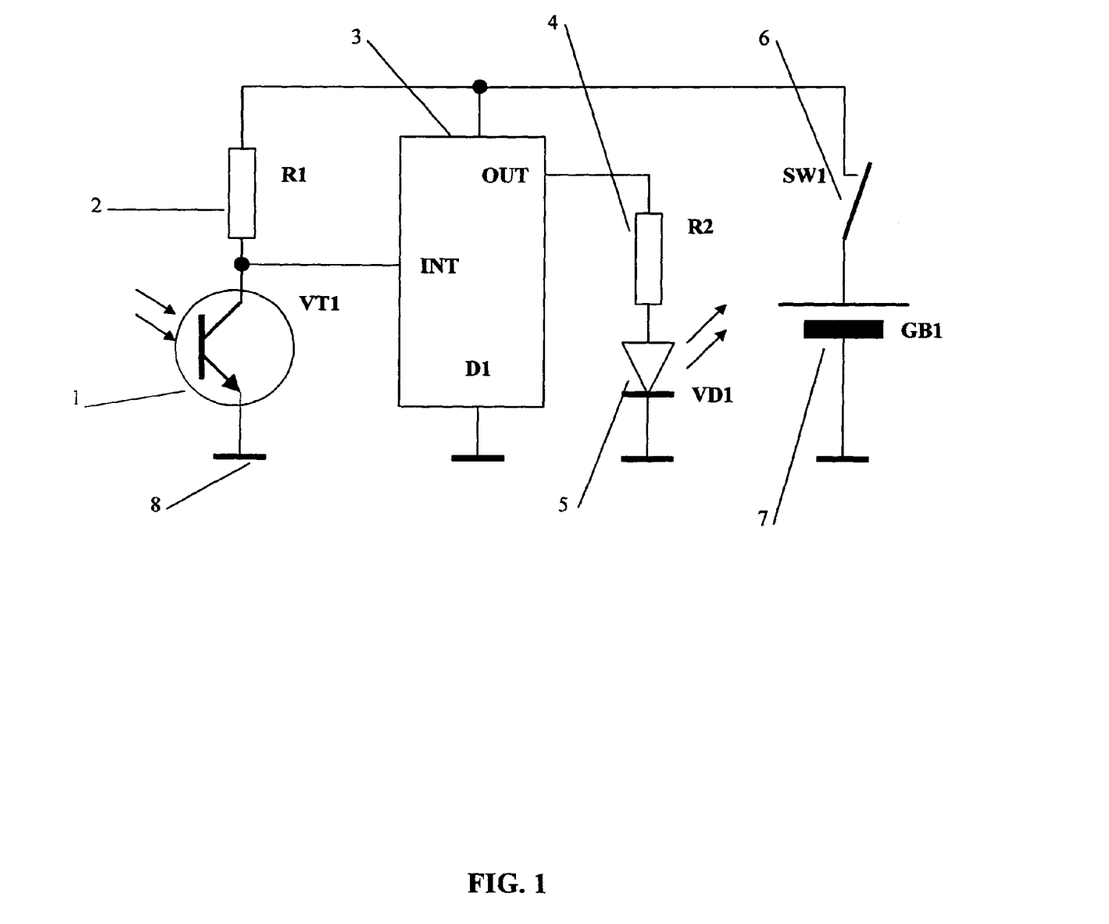
FIG. 1 presents a firefly electric schematic diagram.

Referring to FIG. 1, there is presented an electric schematic diagram of artificial firefly sparks. The main parts in this schematic are as follows: 1-VT1 is a phototransistor, one of samples utilized here is L-51P3C made by Kingbright Electronics; 2-R1 is a resistor, one of samples utilized here is CR0805-J-104 made by Bourns Inc.; 3-D1 is a microprocessor microcontroller, a sample utilized here is PIC12C508 made by Microchip Technology Inc.; 4-R2 is a resistor, one of samples utilized here is CR08054-104 made by Bourns Inc.; 5-LED is a light emitting diode, a sample utilized here is L934-LSRD made by Kingbright Electronics; 6-SW1 is a power switch, there are no real restrictions on a switch, since electric currents and potentials are quite low and any compact switch works fine here; 7-GB1 is a battery, or batteries, in this case three batteries of GP357A of Golden Power Industries Ltd have been utilized.

Again referring to FIG. 1, switch's 6-SW1 function is for turning on an electric schematic into an operational state. For example, in one of the approaches shown on FIGS. 8-9 a firefly body is made of two halves and a switch 6 can be turned on when both halves are applied to each other to close a firefly body as one piece. Batteries 7-GB1 are three batteries connected in series providing a power supply with a voltage of 2.7-3.6 V. Resistor 2-R1 develops a logical unit at a microprocessor's 3 entrance INT, if a phototransistor 1-VT1 is closed. Resistor 4-R2 limits electric current through a LED VD1 5. Ground shown by a number 8.

Figure 2:
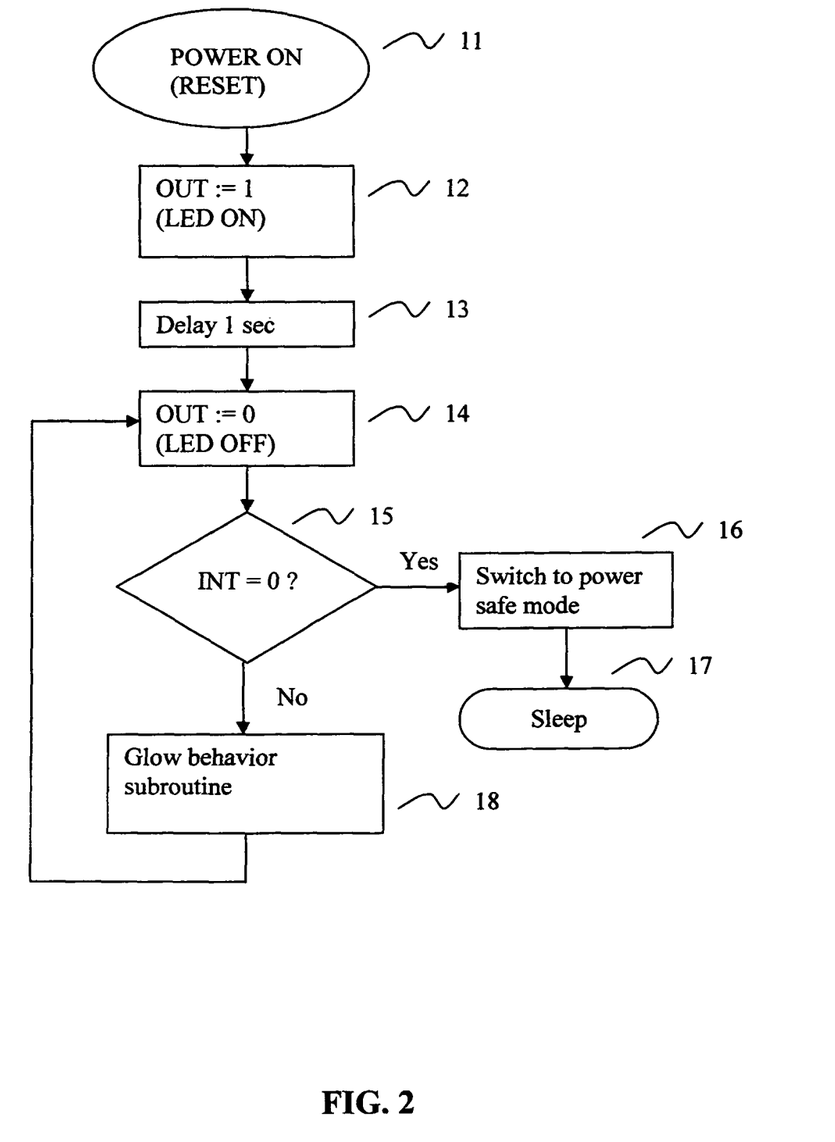
FIG. 2 presents a program for a main flow diagram.

Referring to FIG. 2, there is shown a main flow diagram of a program. After turning on power by a switch 6-SW1, shown on FIG. 1, and if such a switch exists, a microprocessor 3-D1, also shown on FIG. 1, releases an internal signal RESET and starts a program 11. With a help of sequence of commands 11, 12 and 13 a LED 5 (FIG. 1, (coming out visible radiation is shown by two arrows) is turned on for just 1 sec and extinguishes. This is done to check, if a firefly's simulator is operating.

Blocks 12, 13 and 14 perform a function for checking an operation capability of a device. Block 15 analyzes signal at entrance INT. Entrance INT is programmed in a way that it reacts to a high amplitude of an interruption signal. If transistor VT1, 1 (FIG. 1) has enough light (shown by two arrows applied to transistor VT1, 1) and it is opened, then at entrance INT of a microprocessor D1, 3 (FIG. 1) there is generated a logical zero, and a current from resistor R1, 2 (FIG. 1) goes through a transistor to ground. In a block 16, processor D1, 3 (FIG. 1) is switched into an interruption regime with low energy consumption and with a possibility of reaction on an interruption signal.

In a block 17, processor D1, 3 (FIG. 1) is in a sleep state until the time, when there will be insufficient light and transistor VT1, 1 (FIG. 1) will be closed. When transistor VT1, 1 (FIG. 1) will be closed, an electric current will stop to be grounded and an electric potential on a resistor R1 of FIG. 1 will provide a singular logical level at a microprocessor's entrance INT of FIG. 1. In this case, a microprocessor D1, 3 (FIG. 1) through a block 15 will start operation of a block 18, which is a subprogram of imitation of a firefly's light behavior.

In FIG. 2 there is not shown a microprocessor's initialization; however, anyone knowledgeable in a programming art can perform an initialization in a way that there will be provided a functionality in a correspondence with an applied algorithm.

Figure 3:
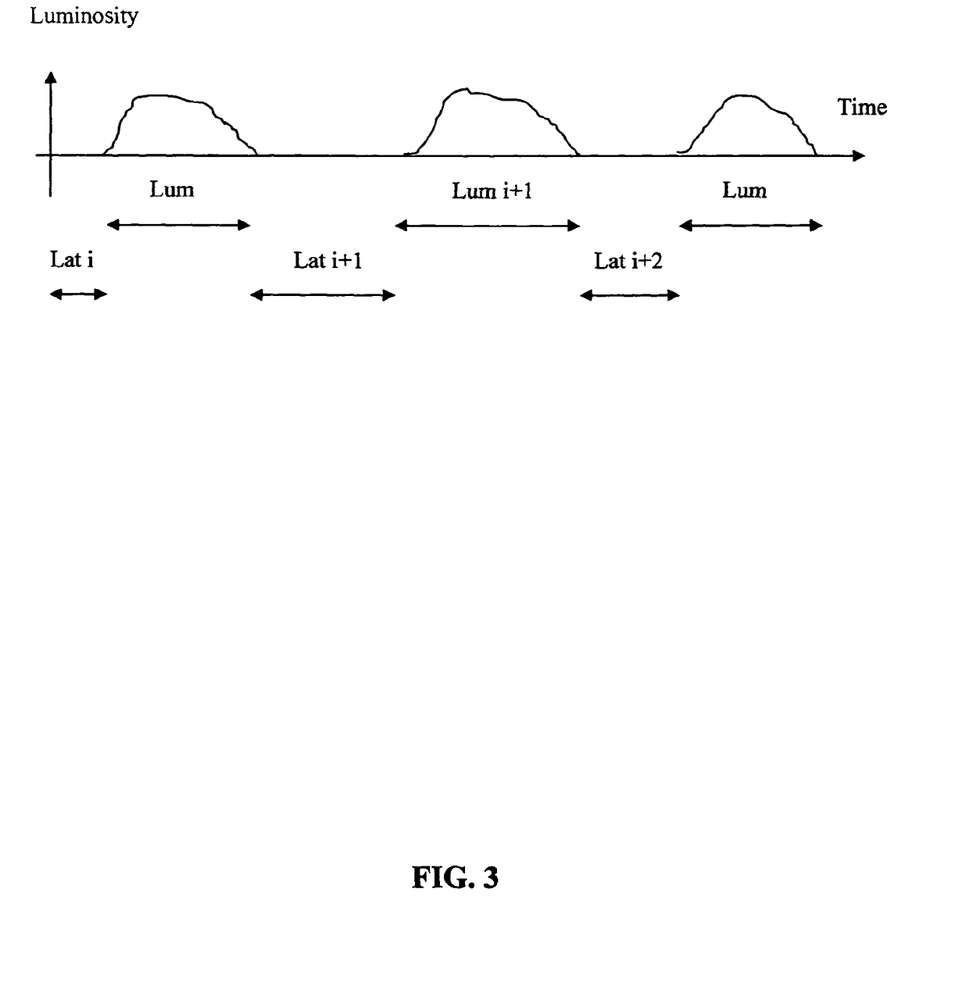
FIG. 3 presents a LED radiation amplitude as a function of time.

Referring to FIG. 3, there is shown a LED radiation amplitude in arbitrary units as a function of time. Time coordinate scale can be from milliseconds to seconds. Such a radiation amplitude dependence of LED simulates a firefly radiation behavior.

Radiation behavior is modeled as a sequence of radiation intervals Lum i (Luminosity) and intervals with absence of radiation Lat i (Latency). Numbers determining intervals Lum i can be equal, and can be not equal between them. It is preferred that they will be not equal. Then, these numbers are given either as a sequence of constants in a microprocessor's D1, 3 (FIG. 1) ROM (read only memory), or they are generated during performance of a subprogram 18 (FIG. 2); for example, as random numbers coming into a given interval (for example, from 2 sec to 15 sec). Numbers determining intervals Lat i can be equal, and can be not equal. It is preferred that they will be not equal. Then, these numbers are given either as a sequence of constants in a microprocessor's D1, 3 (FIG. 1) ROM, or they are generated during performance of a subprogram 18 (FIG. 2), as random numbers coming into a given interval (for example, from 7 sec to 45 sec).

Figure 4:
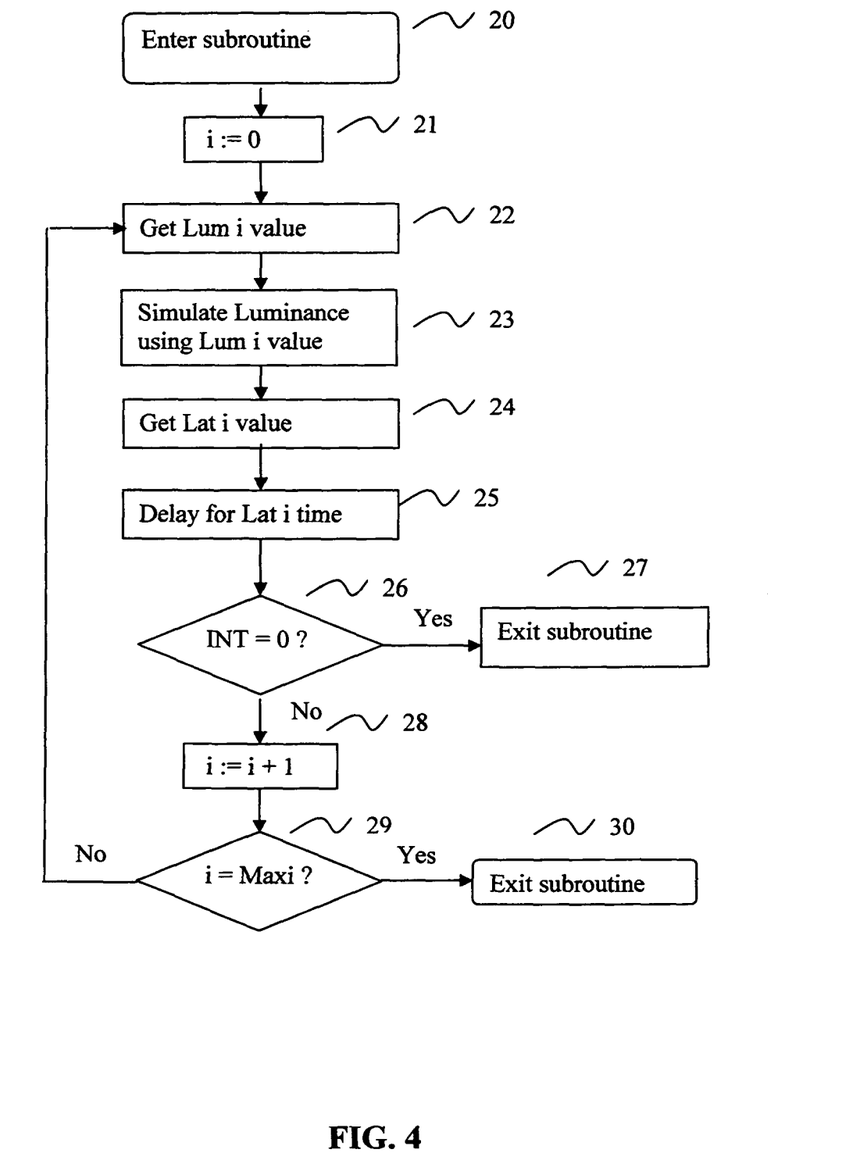
FIG. 4 presents a subprogram of a firefly radiation behavior modeling.

Referring to FIG. 4, there is shown a subprogram 18 from FIG. 3 called here as a subprogram 27 that describes a modeling of radiation behavior. After entering entrance 20 in a subprogram of radiation behavior modeling in a block 21 there is established 0 (zero) at radiation intervals counter i. In a block 22, the next radiation time duration Lum is determined. Lum i can be either a random number in a certain range of numbers, or can be taken from a ROM table. In a block 23, a radiation pulse modeling subprogram with duration Lat i is called. Lat i can be either a random number in a certain range or it can be taken from a table in ROM. In a block 24, there is determined a pause time between radiation intervals Lat i. Lat i can be either a random number in a certain range or it can be taken from a table in ROM. In a block 25, there is performed a certain time delay for a Lat i time. Due to this, there is modeled an i+1th interval of radiation absence. In a block 26 there is checked an electric potential at entrance INT of a processor D1 3 (FIG. 1). If it is equal to 0 (zero), it means that an amplitude of external radiation is increased (for example, because electric lights are turned on, or because the Sun rises), and it is necessary to interrupt a firefly's sparks, and to move out from a subprogram 27.

If a signal at entrance INT of microprocessor D1, 3 (FIG. 1) is 1 (one). meaning that a level of external illumination is low, an increase of a sparks counter in a block 28 takes place; and then there is a checking, if there is achieved a maximum number of sparks Maxi in a block 29. The maximum number of sparks Maxi can be given in the program by a constant value, and can be calculated at each request of a procedure 18 as a random number in a certain range. If the maximum number of sparks is not achieved, the program transfers the control to a block 22 for release of a next spark. If the maximum number of sparks is achieved, it gives a command for an exit from a subprogram in a block 30.

Figure 5A:
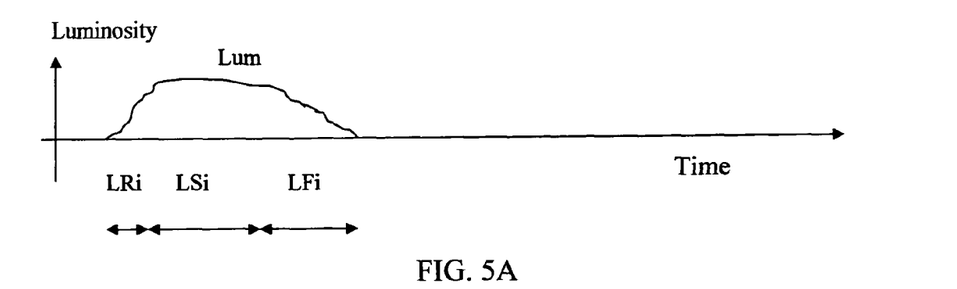
FIG. 5A presents a firefly's real luminosity amplitude as a function of time.
Figure 5B:
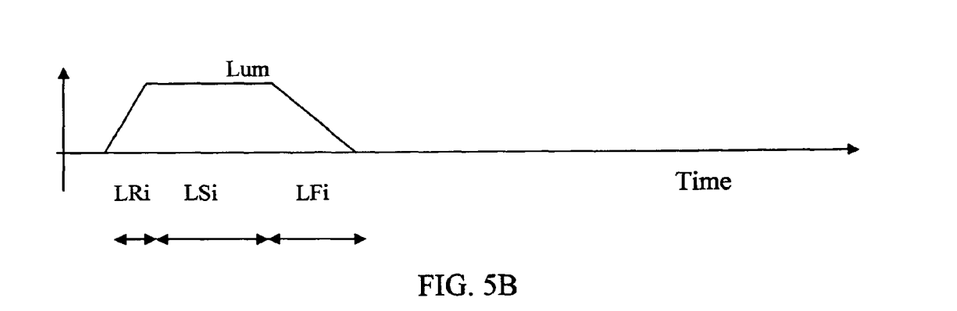
FIG. 5B presents a firefly's simulation luminosity amplitude as a function of time.

Referring to FIG. 5A, there is presented a radiation intensity amplitude in arbitrary units that is called Luminosity as a function of time for a firefly's one spark. This radiation is simulated by a LED radiation and presented in FIG. 5B. Each stage of a firefly Luminosity Lum i shown in FIG. 5A is possible to present by simplified three phases: an increase of Lri (Luminosity Rise), a high stable amplitude LSi (Luminosity Stable), and a decay LFi (Luminosity Fall), which are approximated by linear segments.

Values LRi, LSi, and LFi can be functions of Lum i value. For example, LRi=Lum i/10, LSi=7×Lum i/10, LFi=Lum i/5 and can be taken from tables characterizing a microprocessor's D1, 3 (FIG. 1) ROM. It is possible to utilize other firefly radiation intervals that can imitate more exactly a firefly, other insects, or organisms producing bioluminescence with its specific light that is a visible radiation natural radiation. For example, each spark can be approximated by not just three linear segments, but by a larger number of linear segments, or by fragments of non-linear functions. For example, a middle segment, LSi can be substituted by a wave-like line that can simulate gradual radiation amplitude oscillations-changes. Those approximations improve simulation of a firefly radiation, other insects, or organisms producing bioluminescence with its specific light that is a visible radiation.

Figure 5C:
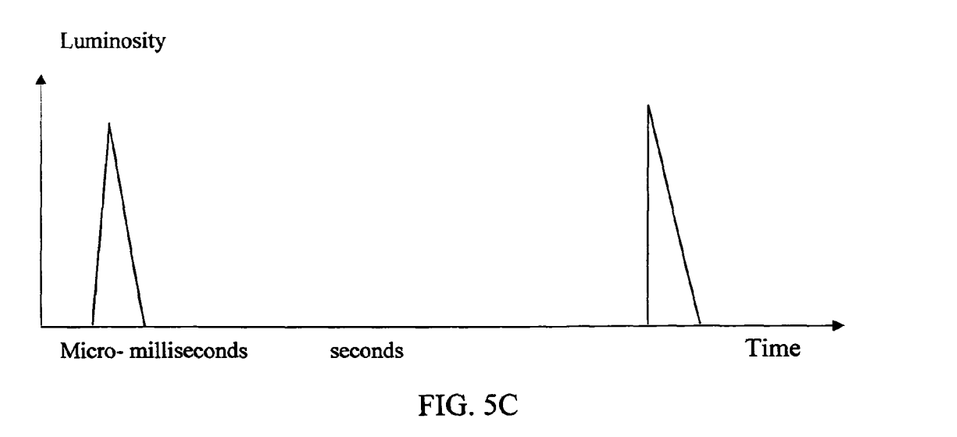
FIG. 5C presents an electric discharge simulation luminosity amplitude as a function of time. Such sparks can be utilized to scare birds in areas that should be restricted for birds.

Referring to FIG. 5C the radiation pulse can be of a significantly short time, from several microsecond and up to one hundred milliseconds. Such radiation pulses simulate a natural lightning, human produced short electrical discharge, small explosion, or gun shot. LED for such a purpose is selected with radiation that is concentrated mainly in a ultraviolet and violet areas. Because, it is well-known scientific fact that birds eyes are very sensitive in ultraviolet and violet wavelengths. For this purpose LED with high luminosity in a violet and ultraviolet wave lengths regions are selected. One of examples is LED in 525 nm wavelength with luminosity at maximum of 10,000 mcad and in 505 nm wavelength with luminosity at maximum of 2,000 mcad can be utilized.

Figure 6:
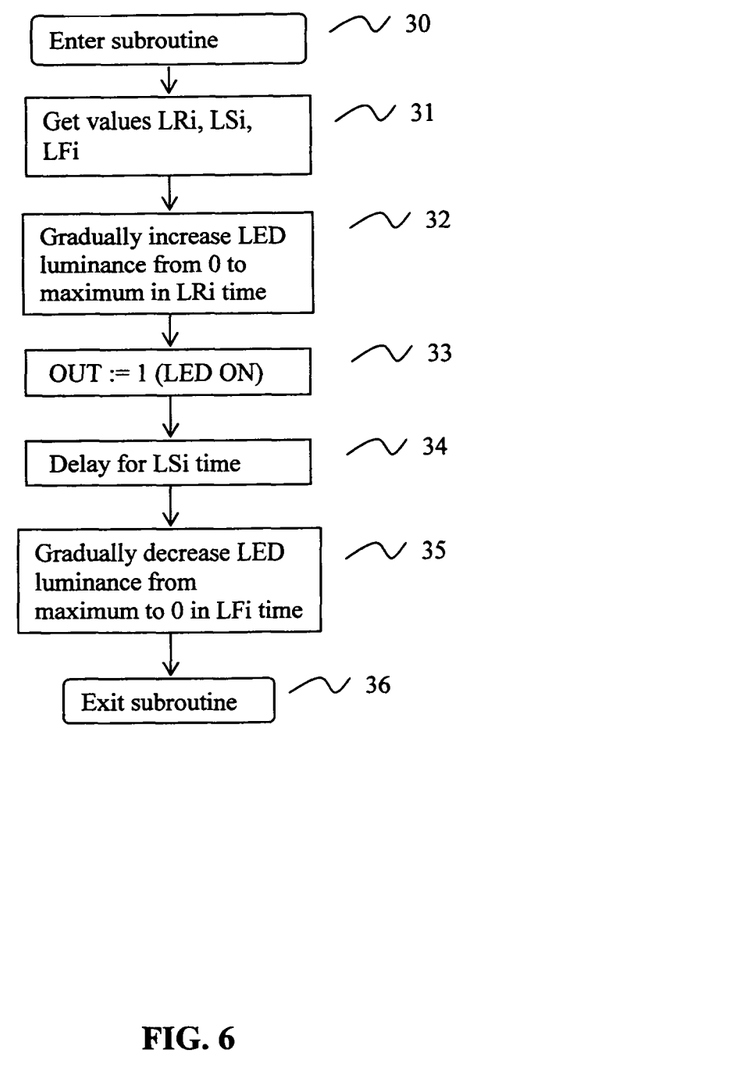
FIG. 6 presents a subprogram for approximation of a firefly spark by three linear segments.

Referring to FIG. 6, there is presented a subprogram 23 of FIG. 4 as follows. After entering 30 of a subprogram 23 (FIG. 4) in a block 31 there will be obtained values of LRi, LSi, and LFi as it was above described. Block 32 is generation of a subprogram of a gradual increase of a LED radiation intensity. Block 33 is turning on LED in case, if it happens to be switched off after returning from a subprogram 31. Block 34 is a delay for a LSi time providing continuous radiation of LED during a LSi time. Block 35 is generation of a subprogram of a gradual decrease of a LED radiation intensity. Block 36 is exit from a subprogram 23 (FIG. 4).

Figure 7:
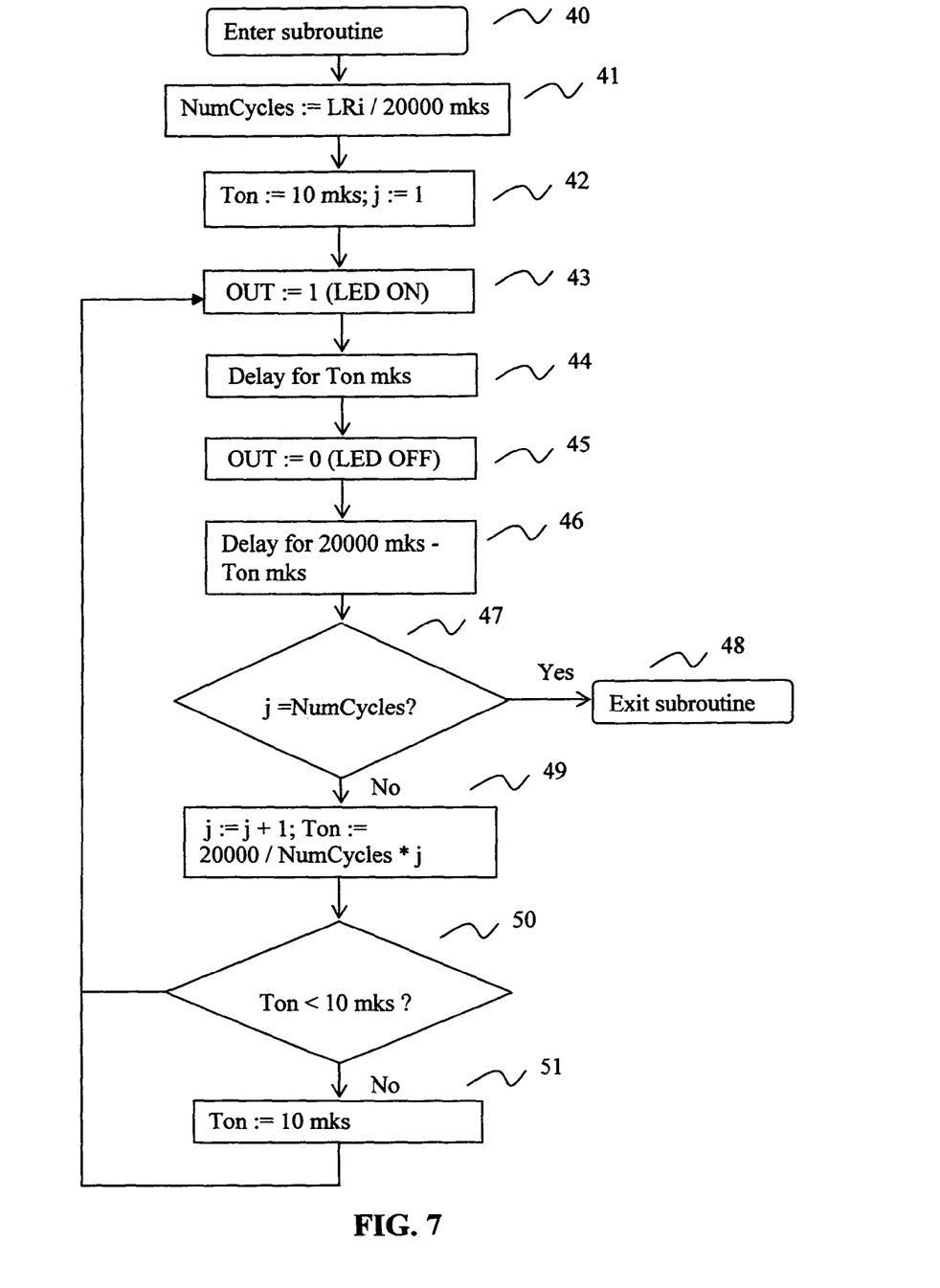
FIG. 7 presents a subprogram of gradual increase of radiation amplitude of a simulated firefly luminosity.

Referring to FIG. 7, there is presented a subprogram of a radiation gradual increase of a firefly simulated radiation. For modeling of a gradual increase of radiation, and also for a gradual decrease of radiation it is possible to utilize a Pulse Width Modulation (PWM) technique.

After entering a procedure in a block 40 there is calculated a number of cycles (NumCycles) PWM in a block 41 as a result from division of LRi in microseconds by 20,000. A number 20,000 (microseconds) corresponds to a frequency of flickering of LED in 50 Hz, which is higher than a threshold of a flickering frequency in 48 Hz that a human eye notices. As one can see, for 60 Hz the situation is simpler.

In a block 42 there is established time for turning on Ton of LED in a PWM given cycle, and also there is initialized a counter of PWM j cycles. In a block 43 LED is turned on. It remains switched on during a delay time Ton in a block 44, and it is switched off in a block 45. Due to this, there is formed a light pulse with duration of about Ton.

In a block 46, a delay takes place for a remaining time of a PWM cycle, which is equal to a PWM period (20,000 mks) minus time of a LED radiation. In a block 47, there is checked if the last PWM cycle is achieved, and, if yes, an exit from the subprogram takes place in a block 48. If the last cycle is not achieved, then in a block 49 there is incremented a counter of PWM cycles, and there is calculated a new value of a LED spark time. In a block 50, there is checked, if the obtained value of a minimum LED spark time (about 10 mks) is less than an assigned time. And if this time is less than a LED minimum spark time, for this value there is assigned as a minimum value of a LED spark time. Not every current pulse applied to LED will cause its radiation visible by a human eye. For regular LEDs the pulse time must be more than 5-10 mks. A radiation decrease takes place in a similar way in a block 51.

Figures 8A, 8B:
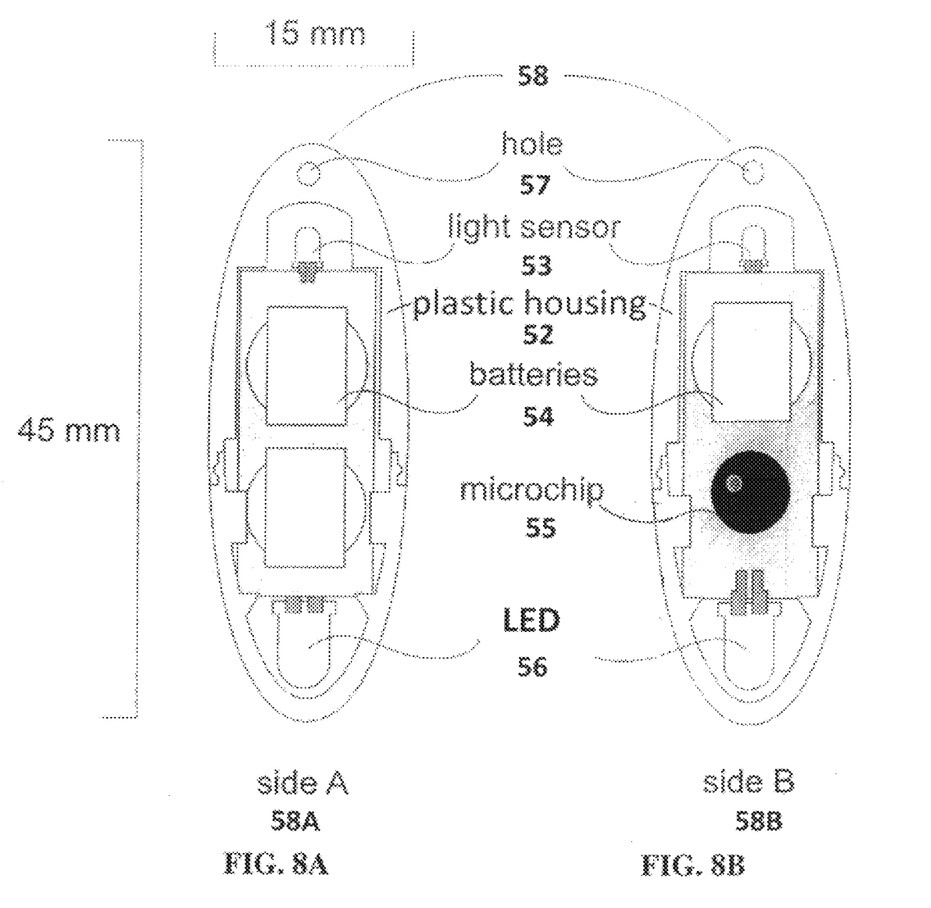
FIG. 8 presents one of alternative versions of a firefly design with a light sensor placed from the side opposite to a LED.
Figure 9:
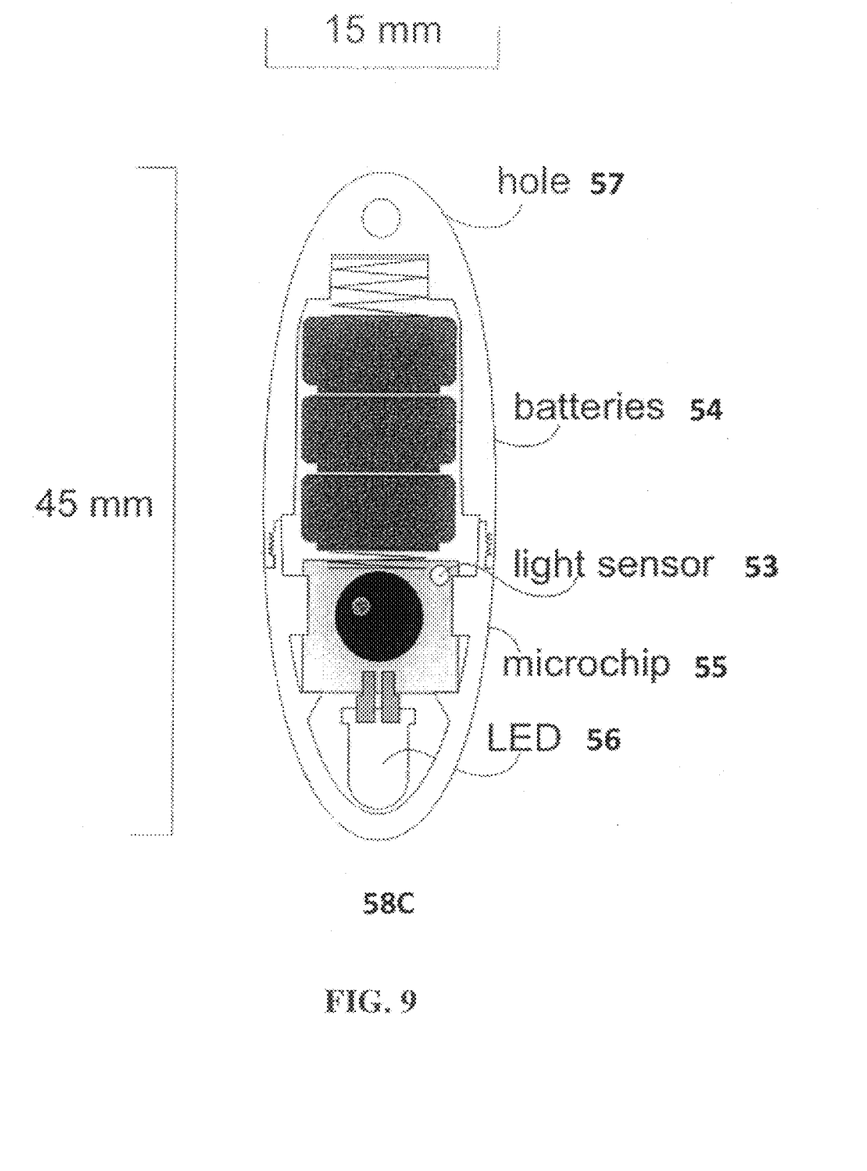
FIG. 9 presents another alternative version of a firefly design with a light sensor placed at a design's center close to a LED.
Figure 10:
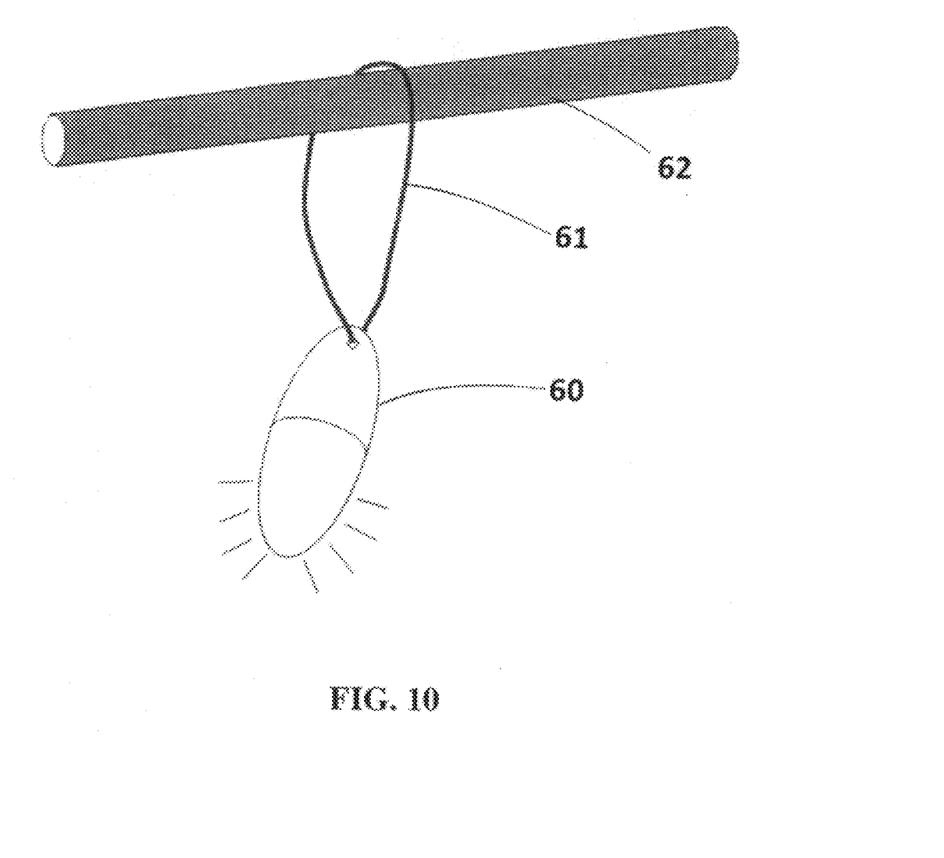
FIG. 10 presents one of alternative ways for placement of the firefly on objects such as tree branch, or other material placed into a garden or a landscape.

Referring to FIGS. 8-10, there are shown preferred embodiments of a firefly decoration that may be displayed in various settings either indoors, or in a landscape, or in public and private gardens. As an example and not by way of limitation, a firefly decoration can be utilized for pleasure views in gardens and landscape, for special events, for observing holidays, for advertising in public place, for attraction to restaurants, private houses, etc.

Referring to FIG. 8, there is shown one of alternative versions of a firefly design with a light sensor 53 placed at the top of electronic design. This particular design 58 has two detachable parts 58A and 58B made of water and humidity proof plastic housing 52. Both parts have a hole 57 that can be used for a firefly placement to trees, bushes, or elsewhere. There are three batteries 54 of GP357A type fabricated by a Golden Power Industries Ltd, a microchip 55 that serves as a microcontroller. LED 56 (in FIG. 1 shown as 5) is placed at lower "abdominal" part of a firefly that is similar to a natural firefly.

Referring to FIG. 9, there is another approach of an artificial firefly design 58C with a light sensor 53 placed close to a microchip 55 and LED 56. All designs 58A, 58B and 58C have the same parts. In FIG. 8 and FIG. 9, as mentioned above, an artificial firefly body made of a plastic waterproof material and in the place of a light sensor location on a firefly's plastic body there is deposition of a paint of colors (red, brown, black) similar to a real firefly with a paint thickness providing sufficient absorption coefficient that this paint reduces light day radiation to a point that it can turn on a light sensor at a necessary time. Special experiments have been made for determination of painting colors (red, brown, black) thicknesses obtaining necessary an absorption coefficient reducing light day radiation for turning on a light sensor at times close to evening, so an artificial firefly could begin its operation just before a sunset.

Referring to FIG. 10, there is shown one of preferred embodiments of a lightning firefly decoration that may be displayed in various settings either indoors, or in a landscape, or in public or private gardens. This figure shows an artificial firefly device 60 placed on a tree or bush 62 by a hook 61. There are many other ways of displaying such devices as single pieces, or a series pieces, similar to Christmas tree decoration, decorative string lights, etc.

Referring again to FIG. 1 that presents the main electronic schematic of the artificial firefly, FIG. 8, 9 that present arrangement of parts in the artificial firefly, there is suggested that in certain cases instead of batteries 7 of FIG. 1 and 54 of FIG. 8, 9 to utilize alternative sources of a power supply such as a regular home electric power, power from larger batteries, power from compact solar panels, etc.

Despite the seemingly complex program, the artificial firefly is made of inexpensive parts and performs assigned tasks of excellent imitation-simulation of a firefly radiation. Similar imitation-simulation of other insects or organisms producing bioluminescence radiation can be provided.

The artificial firefly device with radiation pulses described by an electric schematic diagram, with a series of logic programs and subprograms, by design pictures on example of an electronic firefly simulating real firefly radiation illustrates preferred embodiments of structure and methods of operation of the present invention. One of feedbacks of the device and the method is simulation of radiation pulses similar to lightning, electrical discharge, gun shots of short microseconds-milliseconds duration to scare birds from certain areas like airports, contaminated ponds, other areas where presence of birds is undesirable. It is to be understood that elements of different construction and configuration and other arrangements thereof, other than those illustrated and described may be applied for providing an artificial firefly, or other insects, animals that can produce radiation in accordance with the spirit of this invention, and such changes, alternations and modifications as would occur to those skilled in the art are considered to be within the scope of this invention as broadly defined in the appended claims.

What is claimed is:

1. A compact electric powered device for radiation simulation of an artificial firefly, other insects, and organisms producing bioluminescence of dimensions similar to real insects with a light emitting diode imitations controlled by an electronic device, comprising:
   at least one light emitting diode (LED);
   electric power means for supplying direct current to said light emitting diode;
   a power processing unit with compact batteries;
   a phototransistor for switching on and off the electronic device with said light emitting diode depending on a surrounding light conditions for imitating the firefly, other insects, or organisms producing bioluminescence radiation;
   a micro-controller that controls program and subprogram of imitation of the firefly, other insects, or organisms producing bioluminescence radiation that comprises of:
   a) LED radiation amplitude detection,
   b) time duration of radiation pulses,
   c) time duration between radiation pulses, d) radiation regularity decay; said subprogram simulating a real radiation of the firefly, other insects, or organisms producing bioluminescence in the form of a "bell-type" shape radiation pulse or other complex forms of radiation sparks from about one hundred milliseconds to seconds time with interruption by short (microseconds) intervals of a visible ultra-violet and violet radiation from about 400 nm to about 700 nm with a peak of radiation at about 500-550 nm, so that the whole "bell-type" shape of the firefly, other insects, or organisms producing bioluminescence is approximated by from several to over 100 linear segments, or by fragments of non-linear segments; said subprogram producing radiation pulses of lightings, electrical sparks, or gun shots at about 400-450 nm from a few microseconds to hundred milliseconds with interruption by seconds to minutes intervals, a series of linear, or wave-type segment phases with luminosity rise, luminosity fall, luminosity constant, or a "bell-type curve" with a signal that is similar to a real firefly, other insects, or organisms producing bioluminescence radiation signal, or lightning, electrical discharge and gun shots; wherein said subprogram generates a series of linear, or wave-type segments responsible for radiation phases comprised of a) luminosity rise, b) luminosity constant, or "bell-type" shape with a maximum signal that is similar to a real firefly, other insects, or organisms producing bioluminescence radiation signal, or lightning, electrical discharge, gun shots, c) luminosity fall, or decay similar to a real firefly, other insects, or organisms producing bioluminescence, radiation signal, or lightning, electrical discharge, gun shots; and a plastic, or china, or other transparent material frame for electronic components; said frame made in the form of the firefly, body of other insects, or organisms producing bioluminescence.

2. The compact electric powered device of claim 1, wherein said artificial firefly, other insects, and organisms producing bioluminescence is utilized with programmed radiation with random, or time dependent sequence of pulses radiation amplitudes, of various luminosity rise time, luminosity constant or a "bell-type curve" with a radiation signal that is similar to an actual firefly, or organisms producing bioluminescence radiation signal, and other effects for various purposes comprised of: creation of light or sound effects with possibilities of affecting the mood or behavior of humans, other animals and insects.

3. The compact electric powered device of claim 1, wherein said artificial firefly, or organisms producing bioluminescence with a light emitting diode imitations firefly, or organisms producing bioluminescence radiation signal, or lightning, electrical discharge, gun shots, is electrically powered either by solar powers, electric batteries or by electric household alternating current.

4. The compact electric powered device of claim 1, wherein said artificial firefly, or organisms producing bioluminescence electric powered device with a light emitting diode imitations firefly, or organisms producing bioluminescence radiation with a paint thickness, or organisms producing bioluminescence body painted in area of the phototransistor that is placed in various parts of the firefly, or organisms producing bioluminescence radiation; said paint serving for regulation of beginning of the firefly, or organisms producing bioluminescence radiation, signaling to electronics a programmed light threshold for beginning, or ending the firefly, or organisms producing bioluminescence electronic program; wherein said paint thickness is selected for specific levels of external radiation at that the artificial firefly, or organisms producing bioluminescence radiation begins operation.

5. The compact electric powered device of claim 1, wherein said artificial firefly, or organisms producing bioluminescence electrically powered device with a light emitting diode imitations firefly, or organisms producing bioluminescence radiation is placed in to a vacuum tight case to prevent penetration of water vapors into internal parts of the device with electronic parts that are sensitive to water vapors and subject for deterioration.

* * * * *